United States Patent [19]

Foster

[11] Patent Number: 4,701,202
[45] Date of Patent: Oct. 20, 1987

[54] MOULDING APPARATUS FOR GLASSWARE FORMING MACHINE

[75] Inventor: Thomas V. Foster, Doncaster, England

[73] Assignee: Emhart Industries, Inc., Farmington, Conn.

[21] Appl. No.: 906,562

[22] Filed: Sep. 8, 1986

Related U.S. Application Data

[63] Continuation of Ser. No. 690,440, Jan. 11, 1985, abandoned, which is a continuation of Ser. No. 527,589, Aug. 29, 1983, abandoned.

[30] Foreign Application Priority Data

Sep. 3, 1982 [GB] United Kingdom ................ 8225188

[51] Int. Cl.⁴ .................... C03B 9/14; C03B 11/12; C03B 9/38
[52] U.S. Cl. .................... 65/265; 65/267; 65/319; 65/356
[58] Field of Search ................ 65/162, 265, 267, 319, 65/355, 356

[56] References Cited

U.S. PATENT DOCUMENTS

| | | | |
|---|---|---|---|
| 3,094,404 | 6/1963 | Lauck | 65/319 |
| 3,235,354 | 2/1966 | Andersen | 65/355 |
| 3,355,277 | 11/1967 | Miller | 65/355 |
| 3,499,746 | 3/1970 | Blankenship et al. | 65/265 |
| 3,586,491 | 6/1971 | Mennitt | 65/265 |
| 3,617,232 | 11/1971 | Goodwin | 65/267 |
| 3,666,433 | 5/1972 | Nebelung et al. | 65/158 |
| 3,860,407 | 1/1975 | Fertik | 65/161 |
| 4,070,174 | 1/1978 | Nebelung et al. | 65/229 |
| 4,251,253 | 2/1981 | Becker et al. | 65/267 |
| 4,361,434 | 11/1982 | Schneider | 65/265 |
| 4,388,099 | 6/1983 | Hermening et al. | 65/267 |
| 4,426,218 | 1/1984 | Montanté et al. | 65/267 |

FOREIGN PATENT DOCUMENTS

| | | |
|---|---|---|
| 881161 | 5/1980 | Belgium . |
| 3123488 | 11/1982 | Fed. Rep. of Germany . |
| 610157 | 6/1926 | France . |
| 1320185 | 1/1963 | France . |
| 2011128 | 7/1979 | United Kingdom . |
| 267843 | 4/1970 | U.S.S.R. . |
| 794020 | 1/1981 | U.S.S.R. . |

Primary Examiner—S. Leon Bashore
Assistant Examiner—Michael K. Boyer
Attorney, Agent, or Firm—Arthur B. Moore

[57] ABSTRACT

The movable side portions of a mould of a cyclicly operating glassware forming machine have cooling passages passing upwardly therein from an entrance in a bottom surface of the side portion. A plenum chamber is formed beneath the side portions and has upwardly opening exits which communicate with the entrances of the cooling passages when the side portions are stationary in either an open or a closed position thereof so that cooling air can pass into the cooling passages. In this way, each cooling passage can be supplied with air at substantially the same pressure and low pressure air can be used.

7 Claims, 3 Drawing Figures

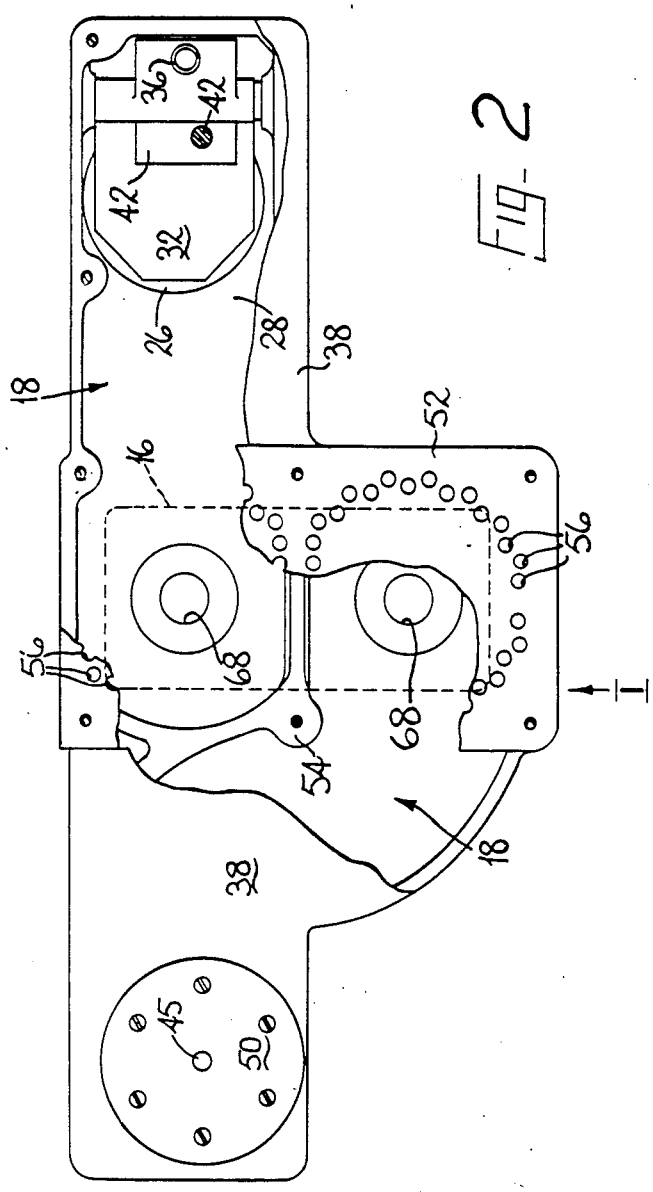

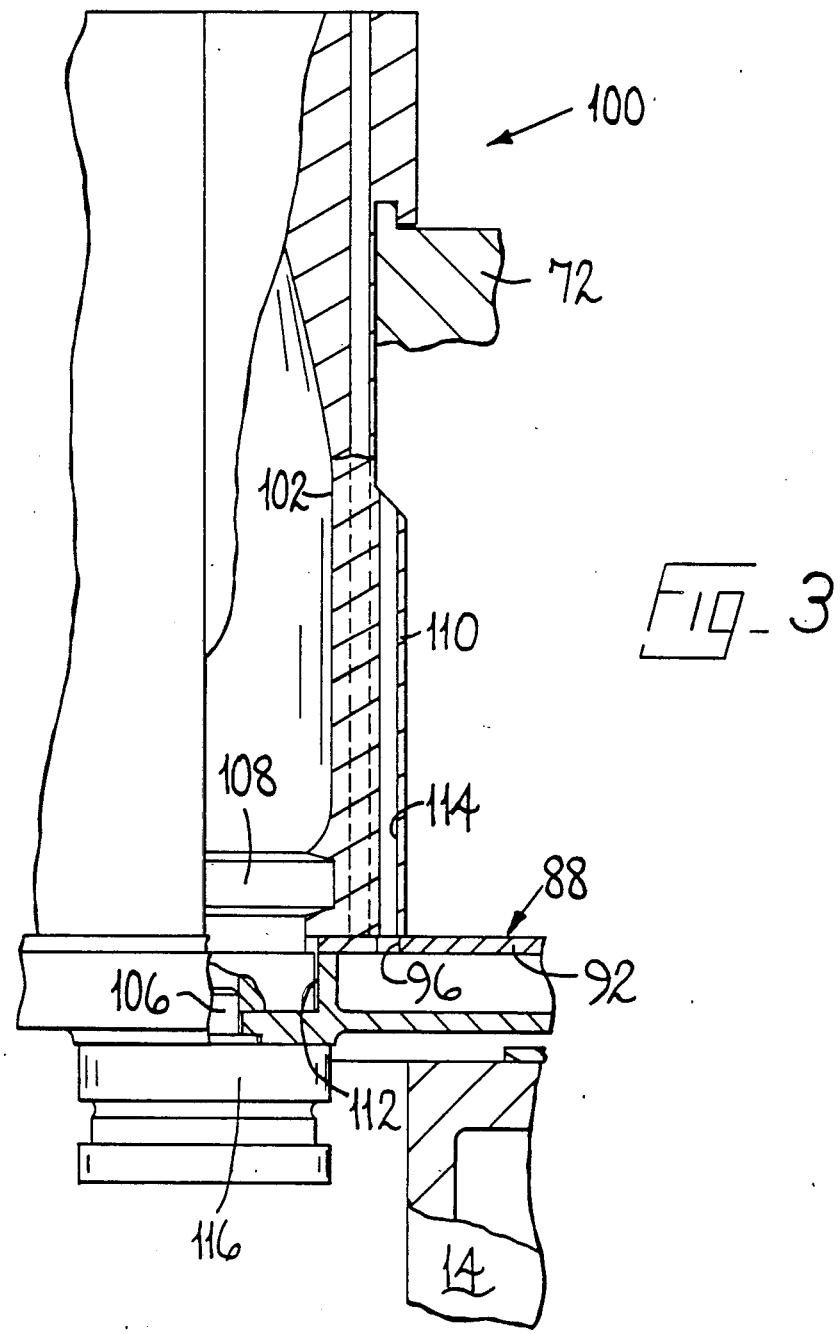
Fig_3

MOULDING APPARATUS FOR GLASSWARE FORMING MACHINE

This is a continuation of co-pending application Ser. No. 690,440 filed on Jan. 11, 1985 which is a continuation of application Ser. No. 527,589 filed on Aug. 29, 1983, both now abandoned.

BACKGROUND OF THE INVENTION

This invention is concerned with a mould arrangement for use in a cyclicly operating glassware forming machine, the arrangement comprising a mould comprising a bottom plate defining a bottom portion of a cavity of the mould in which molten glass is moulded in the operation of the machine, and two side portions defining side portions of the cavity, each side portion being movable in a cycle of operation of the machine to a first position thereof in which it engages the bottom plate and the other side portion to co-operate in defining the mould cavity so that moulding can take place and to a second position thereof in which the side portions are separated to allow moulded glass to be removed from the mould cavity, the side portions also defining cooling passages passing upwardly through the side portions through which air can pass to cool the side portions.

In a glass container manufacturing machine of the so-called "individual section" type, a number of container making units or sections are arranged side by side, are fed with glass from a common source, and feed their output to a common conveyor. Each of these sections has at least one parison mould in which a parison is formed from a gob of molten glass delivered to the mould, and at least one blow mould in which parisons are blown to the shape of the container. The blow mould comprises a stationary bottom plate which defines a bottom portion of a cavity of the mould and two side portions defining side portions of the cavity. The two side portions are mounted on supporting arms which are movable to move the side portions towards one another into a first, closed, position in which the side portions engage the bottom plate and each other so that a parison is enclosed in the cavity defined by the side portions and the bottom plate. The arms are also movable to move the side portions away from one another into a second, open, position to allow moulded articles to be removed from the mould.

Since the moulds of an individual section type machine absorb heat from the glass at a rate which is faster than the heat can be dissipated to the surrounding atmosphere without additional cooling, such moulds are supplied with cooling means which cool the mould so that it remains at a substantially constant average temperature during successive operations of the machine. Because the sections of an individual section type machine need to be close together, for reasons of glass supply, only very limited space is available around the mould for the provision of cooling means. One solution to this problem is to feed cooling air through the frame of the machine section to a vertical cooling stack which is provided with nozzles which direct the air on to the outside of the mould. This solution, however has the disadvantage that the arms supporting the side portions of the mould interfere with the flow of air to the mould and also it is difficult to provide differential cooling around the mould as is desirable. Furthermore, such cooling stacks are a source of undesirable noise. In another type of cooling means, cooling air is supplied through the supporting arms of the side portions of the mould to a chamber around the mould. This type has the disadvantage that it requires expensive machining of the arms, to allow both for the movement of the arms and for the flow of the cooling air. Furthermore, as a seal has to be provided between the arm and the side portion of the mould, delays occur in changing moulds and the cost of the mould is increased. It is also difficult to provide differential cooling around the mould. Attempts have also been made to cool moulds by passing cooling air through passages in the side portions thereof. Examples can be found in U.K. Pat. No. 1337292 and U.S. Pat. No. 4,251,253 (FIGS. 10 to 12). In these arrangements, air is brought through the supporting arms to the passages through pipes. Thus, expensive machining of the arms is required and also pipe connections are involved between the arms and the mould portions thereby causing delay to mould changes and increasing the cost of the moulds. Furthermore, in these arrangements the cooling air makes sharp changes of direction in the mould so that considerable resistance to air flow is created requiring the use of high pressure air to achieve adequate air flow. The use of high pressure air is undesirable because of the expense involved. Furthermore non-uniform air flow is created distorting the cooling effect and making it difficult to predict. Thus, it becomes difficult to predict where to position the cooling passages to achieve the optimum cooling effect. If the passsages are not initially correctly positioned, the cooling effect can be adjusted by inserting plugs or insulating sleeves into the passages but this is a time-consuming trial-and-error method because the effects of the plugs and/or sleeves are again hard to predict.

It is an object of the present invention to provide a mould arrangement in which passages in the side portions of the mould can be supplied with cooling air at a substantially uniform pressure and with a uniform flow pattern.

BRIEF SUMMARY OF THE INVENTION

The invention provides a mould arrangement for use in a cyclicly operating glassware forming machine, the arrangement comprising a mould comprising a bottom plate defining a bottom portion of a cavity of the mould in which molten glass is moulded in the operation of the machine, and two side portions defining side portions of the cavity, each side portion being movable in a cycle of operation of the machine to a first position thereof in which it engages the bottom plate and the other side portion to co-operate in defining and mould cavity so that moulding can take place and to a second position thereof in which the side portions are separated to allow moulded glass to be removed from the mould cavity, the side portions also defining cooling passages passing upwardly through the side portions through which air can pass to cool the side portions, characterised in that the cooling passages in each side portion each have an entrance in a bottom surface of that side portion and the mould arrangement also comprises a plenum chamber extending beneath the first or the second position of each side portion and having one or more exits which open upwardly and communicate, when the side portion is above the plenum chamber, either directly or through vertical passages with the entrances of the cooling passages so that air is supplied to each cooling passage at substantially the same pressure, the plenum chamber also having an entrance connected to air supply means operable to blow air into the plenum chamber.

In a mould arrangement according to the last preceding paragraph, air reaches the entrance of each of the cooling passages at substantially the same pressure, this being ensured by the plenum chamber. The term "plenum chamber" where used herein refers to a chamber whose exit or exits are sufficiently remote from its entrance and whose volume is sufficiently large that a substantially uniform pressure is created across the exit or exits of the chamber. Furthermore, the straight flow paths for the cooling air reduce non-uniform air flow therein to a minimum. Accordingly, it is possible to predict accurately the cooling effect of each passage and the distribution of cooling around the cavity can be controlled by positioning of the passages as determined by mathematical models constructed to obtain an optimum cooling distribution. Furthermore, the flow of cooling air is not interferred with by the arms supporting the side portions of the mould and the air does not pass through these supporting arms.

The passages in the side portions of the mould may be formed by bores through the side portions themselves or by spaces between fins of the side portions, in which case, the open side of the space may be closed by an external jacket attached to the side portion to prevent air escaping from the passage.

Although the air may be supplied to the cooling passages, when the side portions are in their first or their second position, the side portions are generally in their first position for a greater portion of the machine cycle than they are in their second position. Furthermore, when in their first position, the side portions engage one another making it easier for one plenum chamber to supply cooling passages in both side portions. Accordingly, it is advantageous if the mould arrangement comprises one plenum chamber for each mould of the machine which extends beneath the first position of both side portions of the mould and has exits which communicate with cooling passages in both side portions.

In order to achieve better control of the cooling by enabling the cooling period to be varied and also to prevent cooling air from impinging directly on molten glass when the mould is open, it is advantageous if the mould arrangement comprises valve means operable to open or close the entrance or the exits of the plenum chamber to cause mould cooling air to leave the plenum chamber for a predetermined period in each cycle of operation of the machine, during which period the exits communicate with the cooling passages.

In order to obtain even more uniform pressures at the entrance of the cooling passages, it is advantageous if the cross-sectional area of the plenum chamber transversely to the direction of air flow therein is at least three times the combined cross-sectional areas of the cooling passages supplied from the plenum chamber.

Since air chambers exist in the frames of conventional individual section machines (they are used to feed air to cooling stacks) and because much pipework is avoided thereby, it is advantageous if the air supply means is arranged to supply air to a chamber formed within a supporting frame of the machine, which chamber communicates with each plenum chamber of the arrangement.

To maximise air use, it is advantageous if each cooling passage extends substantially in a straight line between its entrance and an exit thereof to atmosphere so that the mass flow of air in the passage is determined by the cross-sectional area and length of the passage and the configuration of the entrance and exit of the passage and not by bends or inserts in the passage or valves associated with the passage.

In order to provide suitable pressure in the plenum chamber, the air supply means is arranged to create a pressure of up to 2 lbs per square inch (1400 mm of water) at the exits of the plenum chamber.

Since different moulds may have different patterns of cooling passages, it may be desirable to change the position of the exit or exits of the plenum chamber and, to accommodate this, the exit or exits may be formed in a plate which is removably mounted on side wall portions of the plenum chamber. Thus, the plate is removable and can be replaced by a plate having a different pattern of exits therein.

In order to allow for height adjustment of the bottom plate, the bottom plate may be mounted on a bottom plate mechanism which is mounted for vertical adjustment on the supporting frame of the machine and the plenum chamber may also be mounted on the bottom plate mechanism. Thus, moulds of different heights can be accommodated by moving the bottom plate mechanism vertically. The bottom plate mechanism may be mounted on a slideway on the frame of the machine and the plenum chamber extend horizontally above the frame and have an entrance which receives the air supplied by the air supply means through a telescopic connection to the interior of the frame.

Where the machine is operating in the so-called "double gob mode", the arrangement comprises a further plenum chamber which extends beneath the side portions of a further mould and has an exit or exits which, when the side portions of the further mould are in their first, closed, or second, open, position, communicate with entrances of passages in the side portions of the further mould, and the air supply means is also arranged to supply mould cooling air to the further plenum chamber.

BRIEF DESCRIPTION OF THE DRAWINGS

FIG. 2 is a plan view with parts broken away of the first illustrative mould arrangement with the mould thereof removed, the direction of view of FIG. 1 is indicated by the arrow I in FIG. 2; and FIG. 3 is a partial side elevational view of a second illustrative mould arrangement with parts broken away to show the construction.

DETAILED DESCRIPTION

Figure 1:
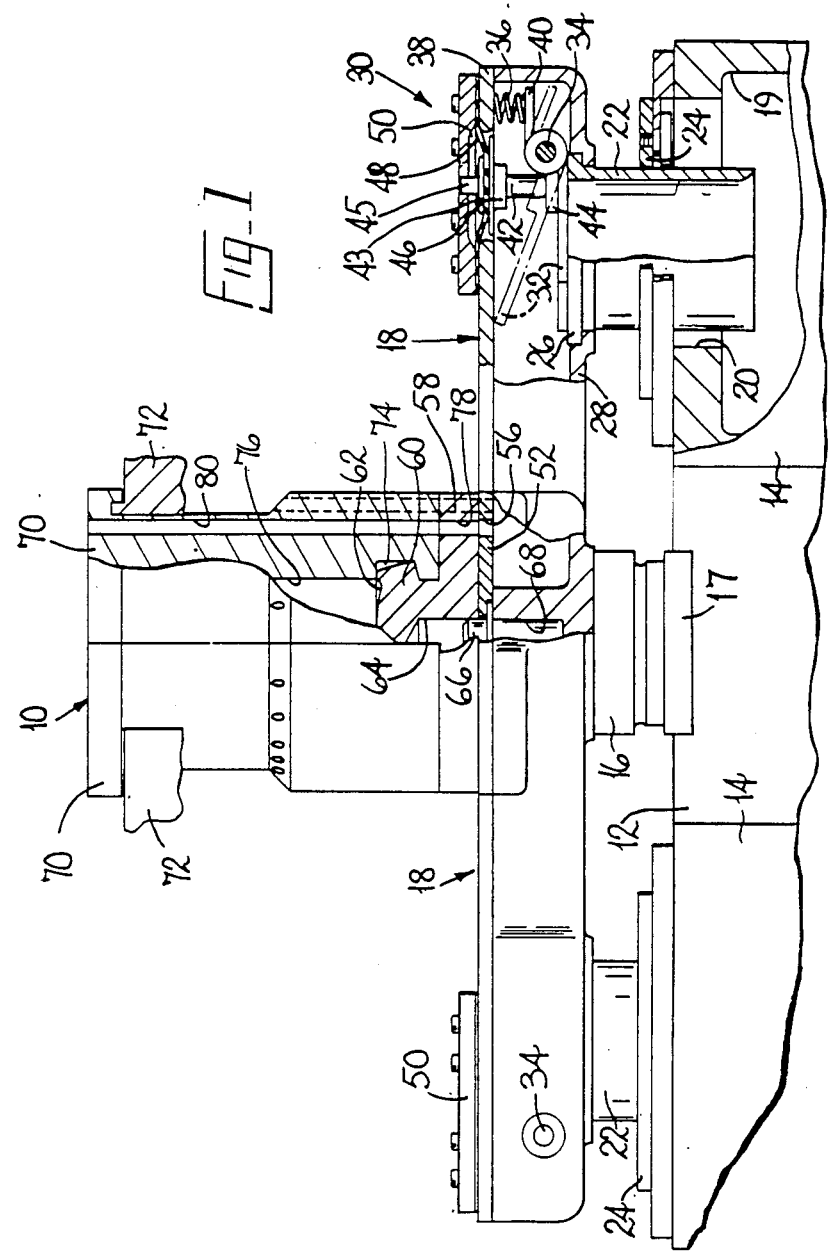
FIG. 1 is a side elevational view of a first illustrative mould arrangement with parts broken away to show the construction.

The first illustrative mould arrangement (shown in FIGS. 1 and 2) comprises two identical moulds 10 arranged side by side along a longitudinal axis of a section of a cyclicly operating glassware forming machine of the individual section type (only one of the moulds 10 is visible in FIG. 1). The first illustrative mould arrangement is mounted on the frame 12 of the machine and is supplied with cooling air through two hollow arms 14 of the frame 12 which are disposed transversely of one of the moulds 10.

An adaptor plate 16 having a fixing 17 of the first illustrative mould arrangement is mounted by clamping means (not shown) engaging the fixing 17 on a bottom plate mechanism (not shown) which is vertically adjustable on the frame 12 in a well-known manner. The adaptor plate 16 has the function of distributing vacuum ducts (not shown) to the moulds 10 which are directly above and plate 16 and of supporting two plenum chambers 18 of the mould arrangement. Each plenum chamber 18 extends in a horizontal plane from above one of the arms 14 and across the adaptor plate 16 beneath an associated one of the moulds 10. One of the plenum chambers 18 extends transversely of the section while the other extends transversely away from its arm 14 and then bends around the other plenum chamber 18 to reach the adaptor plate 16 (see FIG. 2).

Each of the plenum chambers 18 is supplied with air under pressure by air supply means. The air supply means comprises blowing means in the form of a fan (not shown) which operates continuously, when the machine is in operation, to blow air into a chamber 19 formed in the interior of the frame 12 and in particular in the interior of the hollow arm 14. Each of the arms 14 has an opening 20 at the top thereof into which a tube 22 is telescopically received. The tube 22 serves to connect the chamber 19 to the plenum chamber 18 and is movable to accommodate changes in the height of the plenum chamber 18. A sealing ring 24 closes the gap between the tube 22 and the arm 14 but allows vertical movement of the tube 22 and limited sideways movement thereof. The upper end of the tube 22 has an external flange 26 which is received within the plenum chamber 18 in a recess in a bottom wall 28 of the plenum chamber 18.

The air supply means also comprises a valve 30 which provides valve means via which the chamber 19 communicates with the plenum chamber 18. The valve 30 therefore acts to open or close an entrance to the plenum chamber 18. The valve 30 is controlled by electronic control means of the machine so that it is open only during a predetermined period of each cycle of operation of the machine during which period cooling is applied to the mould 10 associated with the plenum chamber 18. The valve 30 is a flap valve which operates to open or close the top of the tube 22. The valve 30 comprises a flap 32 which is mounted for pivoting movement about an axis 34 between a closed position (shown in solid line in FIG. 1) in which the flap 32 closes the top of the tube 22 and an open position (shown in broken line in FIG. 1). A spring 36 acts between an upper wall 38 of the plenum chamber 18 and a rearward exrension 40 of the flap 32 to urge the flap 32 into its open position while a diaphragm piston and cylinder arrangement is operable to move the flap 32 into its closed position by pressing downwards on the upward extension 44 of the flap 32. The diaphragm piston and cylinder arrangement comprises a piston 42 which has a head 43 which is secured by a nut 46 to a diaphragm 48 of a pneumatic cylinder 50. A pin 45 passes through the diaphragm 48 and is received in a recess 42 so that the pin 45 serves to guide the motion of the piston 42. When air under pressure is introduced into the cylinder 50, the diaphragm 48 is pressed downwards taking with it the piston 42 which then presses down on the extension 44 of the flap 32. The use of a flap valve of this type operated by a diaphragm piston and cylinder arrangement saves space particularly in the vertical direction.

Above the adaptor plate 16, the tops of the two plenum chambers 18 are closed by a common sealing plate 52 which abuts the upper walls 38. The sealing plate 52 is screwed to side walls 54 (FIG. 2) of the plenum chambers 18 and is hence readily removable. The sealing plate 52 has passages 56 passing vertically upwards therethrough which form upwardly opening exits through which air can leave the plenum chambers 18.

Each of the moulds 10 of the first illustrative mould arrangement comprises a bottom plate 58 mounted on top of the sealing plate 52. Each bottom plate 58 has a raised section 60 with an upper surface 62 which defines a bottom portion of a cavity of the mould 10 in which molten glass is moulded in the operation of the machine. Each bottom plate 58 has an internal chamber 64 from which vacuum can be applied, in conventional manner, to the mould 10. The chamber 64 is connected, via a floating sealing member 66 located in a hole in the sealing plate 52, to a tube 68 which passes upwardly through the plenum chamber 18 to connect the bottom plate 58 to the adaptor plate 16. Vacuum can thus be applied through the tube 68 to the bottom plate 58.

Each of the moulds 10 also comprises two side portions 70 defining side portions of the mould cavity. The side portions are mounted on supporting arms 72 (only a portion of each arm 72 is shown in FIG. 1). The arms 72 are movable by moving means (not shown), in conventional manner, so that each side portion is movable in a cycle of operation of the machine into a first, closed, position thereof (shown in FIG. 1) in which it engages the bottom plate 58 and the other side portion to co-operate in defining the mould cavity so that moulding can take place or away from the other side portion into a second, open, position thereof in which the side portions are separated to allow moulded articles to be removed from the mould cavity. The side portions 70 move above the plenum chambers 18 which extend in a horizontal plane beneath the side portions 70 and in particular beneath their first, closed, positions. When in their first, closed, position, the side portions 70 engage the bottom plate 58 with the section 60 of the bottom plate 58 being received in grooves 74 in the side portions 70. When in their closed position, the side portions 70 also engage one another and surfaces 76 thereof co-operate with the surface 62 to define the mould cavity.

The bottom plate 58 has vertical passages 78 therein with which the exits 56 through the sealing plate 52 communicate so that cooling air flows from the exits 56 into the passages 78, the passages 78 passing vertically upwards through the bottom plate 58. These passages 78, when the side portions 70 are in their first, closed, position above the plenum chamber (see FIG. 1), communicate with cylindrical longitudinal cooling passages 80 defined by the side portions 70 of the mould 10. The passages 80 each have an entrance in a bottom surface of the side portion 70 and pass upwardly through the portion 70 so that each cooling passage 80 extends substantially in a straight line between its entrance and an exit thereof to atmosphere. Thus, air flows from the passages 78 into the passages 80 and up through the passage 80. The passages 80 are distributed around the mound 10 so that air passing therethrough from the plenum chamber 18 has a desired cooling effect on the mould 10. The passages 80 are formed by circular bores in the portions 70 and may be distributed as required to achieve the desired cooling effect. In the first illustrative mould arrangement, the passages 80 are distributed about a circle about a central axis of the mould cavity (see FIG. 2).

In the operation of the first illustrative mould arrangement, when the side portions 70 are in their first, closed, position, the air pressure is removed from the cylinders 50 allowing the flaps 32 to move to their open positions and air under pressure to enter the plenum chambers 18. The air supply means is arranged to create a pressure above atmospheric pressure of up to 2 lbs per square inch (1400 mm of water). The air leaves the chambers through the exits 56 and the passages 78 and 80 cooling the mould 10 as it passes therethrough. After a predetermined period, which may or may not be the same for each mould, air under pressure is applied to the cylinder 50 closing the flap 52 and cutting off the supply of air. The predetermined period may be varied at will to alter the cooling effect achieved. Although in the first illustrative mould arrangement the sealing plate 52 has one hole 56 for each of the passages 78 and 80, in modifications of the first illustrative mould arrangement, the plate 52 may have slots which provide access for air to more than one of the passages 78 and 80 and indeed the plenum chamber 18 may have only one exit accommodating all the passages 78 and 80. The plenum chambers 18 are designed so that the entrance thereof is sufficiently remote from the exits thereof that a substantially uniform pressure is achieved across the entrances of the passages. The exits are upwardly facing and air leaving the plenum chamber 18 can flow in a straight path up the passages 78 and 80 thereby reducing non-uniform air flow to a minimum.

The plenum chambers 18 are constructed so that air is supplied to each cooling passage 80 at substantially the same pressure. To this end the entrance of each plenum chamber 18 is sufficiently remote from the exits and the volume thereof is sufficiently large to achieve this effect. It is found to be desirable if the cross-sectional area of the plenum chamber 18 transversely to the direction of air flow therein is at least three times the combined cross-sectional areas of the cooling passages 80 supplied from the plenum chamber. In the first illustrative mould arrangement, each plenum chamber 18 supplies 32 cooling passages of 6 mm diameter. This gives a combined cross-sectional area of 905 sq.mm while the plenum chamber is 37 mm high and 80 mm wide giving a cross-sectional area of 2960 sq.mm.

In the first illustrative mould arrangement, the velocity of air flow through the passages 80 is determined by the cross-sectional area and length of the passage since there are no other substantial resistances to the air flow. This makes practical the use of low pressure air which can readily be supplied by simple fans as used in conventional machines for supplying cooling stacks. Furthermore, the behaviour of the air can readily be predicted allowing accurate positioning of the passages 80.

The second illustrative mould arrangement shown in FIG. 3, comprises two moulds 100 which are of similar construction to the moulds 10 except that their bottom plates 108 do not extend beneath their side portions 110 being received in a recess 112 formed by the walls of a plenum chamber 88 which is above an adaptor plate 116. The mould 100 has a cavity 102 and a floating sealing member 106 is accommodated in the recess 112 to transmit vacuum to the bottom plate 108. The plenum chamber 88 extends in a horizontal plane beneath the side portions 110 and has exits 96 in a sealing plate 92 thereof which, when the side portions are in their first, closed, position, communicate directly with entrances of the passages 114 in the side portions 110. If it is desired to cool the bottom plate 108 in the second illustrative mould arrangement, exits from the plenum chamber 88 may be formed in the side wall of the plenum chamber 88 around the recess 112 so that air may flow into cooling passages (not shown) in the bottom plate 108.

In variations of the first and the second illustrative mould arrangements, the plenum chamber 18 or 88 may have exits which form nozzles which direct air on to external surfaces of the side portions 70 or 110 of the mould 10 or 100. Furthermore, the valve means may not control the entrance to the plenum chamber but instead control the exit thereto. For example, a sliding plate can be provided beneath the sealing plate 52 or 92 and slide back and forth under the influence of a piston and cylinder assembly (for example) to open or close the exits 56 and 96 to the plenum chambers 18 and 88. Furthermore, mould arrangements according to the invention may have one sealing plate per plenum chamber and any desired number of plenum chambers each associated with one or more moulds. If, however, each plenum chamber is associated with one mould only, the advantage of individual control of the cooling of the mould is readily obtained. The plenum chamber exits may also communicate with the entrances of the cooling passages when the side portions 70 or 110 are in their second, open, position rather than in their first, closed, position.

When a mould is to be changed in either the first or the second illustrative mould arrangement, this can be done without difficulty, if necessary removing the sealing plate 52 or 92 and replacing it with another having a pattern of exits 56 or 96 appropriate to the new mould 10 or 100. If the new mould 10 or 100 is of different height, the adaptor plate 16 or 116 is raised or lowered by raising or lowering the bottom plate mechanism, taking with it the plenum chambers 18 or 88, with the tubes 22 sliding out of or into the arms 14.

I claim:

1. A moulding apparatus for use in a cyclically operating glassware forming machine, comprising a mould including a bottom plate defining a bottom portion of a cavity of the mould in which molten glass is moulded in the operating of the machine, and two side portions defining side portions of the cavity, each side portion being movable in a cycle of operation of the machine to a first position thereof in which each side portion engages the bottom plate and the other side portion to cooperate in defining the mould cavity so that moulding can take place and to a second position thereof in which the side portions are separated to allow moulded glass to be removed from the mould cavity, the side portions also including cooling passages passing upwardly through the side portions through which air can pass to cool the side portions, wherein the cooling passages in each side portion each have an entrance in a bottom surface of that side portion and the moulding apparatus further comprises a single plenum chamber extending beneath each of the side portions when the side portions are in the first position and having at least one exit which opens upwardly and communicates, when the side portions are in the first position, through vertical passages in the bottom plate with the entrances of the cooling passages, the plenum chamber also having an entrance connected to air supply means for blowing air into the plenum chamber and valve means for opening and closing the entrance or the at least one exit of the plenum chamber to cause mould cooling air to leave the plenum chamber for a predetermined period while the side portions of the mould are in the first position, said plenum chamber and said at least one exit having dimensions such that while said valve means opens the entrance or the at least one exit, air will be supplied to each cooling passage at substantially the same pressure.

2. A moulding apparatus for use in a cyclically operating glassware forming machine, comprising a mould including a bottom plate defining a bottom portion of a cavity of the mould in which molten glass is moulded in the operation of the machine, and two side portions defining side portions of the cavity, each side portion being movable in a cycle of operation of the machine to a first position thereof in which each side portion engages the bottom plate and the other side portion to cooperate in defining the mould cavity so that moulding can take place and to a second position thereof in which the side portions are separated to allow moulded glass to be removed from the mould cavity, the side portions also including cooling passages passing upwardly through the side portions through which air can pass to cool the side portions, wherein the cooling passages in each side portion each have an entrance in a bottom surface of that side portion and the moulding apparatus further comprises a single plenum chamber extending beneath each of the side portions when the side portions are in the first position and having at least one exit which opens upwardly and communicates, when the side portions are in the first position, directly with the entrances of the cooling passages, the plenum chamber also having an entrance connected to air supply means for blowing air into the plenum chamber and valve means for opening and closing the entrance or the at least one exit of the plenum chamber to cause mould cooling air to leave the plenum chamber for a predetermined period while the side portions of the mould are in the first position, said plenum chamber and said at least one exit having dimensions such that while said valve means opens the entrance or the at least one exit, air will be supplied to each cooling passage at substantially the same pressure.

3. A moulding apparatus according to claim 1, wherein the cross-sectional area of the plenum chamber transversely to the direction of air flow therein is at least three times the combined cross-sectional areas of the cooling passages supplied from the plenum chamber.

4. A moulding apparatus according to claim 1, wherein the air supply means supplies air to a chamber formed within a supporting frame of the machine, which chamber communicates with each plenum chamber of the arrangement.

5. A moulding apparatus according to claim 1, wherein each cooling passage extends substantially in a straight line between an entrance and an exit thereof to the atmosphere so that the mass flow of air in the passage is determined by the cross-sectional area and length of the passage and entrance and exit configurations of the passage.

6. A moulding apparatus according to claim 1, wherein the bottom plate is mounted on a bottom plate mechanism which is mounted for vertical adjustment on a supporting frame of the machine and the plenum chamber is also mounted on the bottom plate mechanism.

7. A moulding apparatus according to claim 1, wherein at least one exit of the plenum chamber is formed in a sealing plate which is removably mounted on side wall portions of the plenum chamber.

* * * * *